United States Patent [19]
Stout et al.

[11] Patent Number: 5,175,022
[45] Date of Patent: Dec. 29, 1992

[54] METHOD OF MAKING OXIDIZER COATED METAL FUELS

[75] Inventors: Mark E. Stout, Plymouth; Gary G. Wittmer, New Hope, both of Minn.

[73] Assignee: Alliant Techsystems Inc., Edina, Minn.

[21] Appl. No.: 732,519

[22] Filed: Jul. 19, 1991

[51] Int. Cl.⁵ .............................. B05D 3/14
[52] U.S. Cl. .................... 427/561; 427/213.31; 427/214; 427/216; 427/217; 427/221; 427/380; 427/383.7; 427/388.5; 427/405; 427/409; 427/424; 427/427; 427/436; 427/598
[58] Field of Search ............. 427/216, 217, 221, 47, 427/213.31, 214, 380, 383.7, 388.5, 405, 409, 424, 427, 436

[56] References Cited

U.S. PATENT DOCUMENTS

| | | | |
|---|---|---|---|
| 4,634,479 | 1/1987 | Buford | 427/216 X |
| 4,671,211 | 6/1987 | Buford | 427/216 X |
| 4,714,051 | 12/1987 | Buford | 427/216 X |
| 4,755,398 | 7/1988 | Buford | 427/216 |
| 4,758,288 | 7/1988 | Versil | 427/216 X |
| 4,794,682 | 1/1989 | Buford | 427/216 X |

Primary Examiner—Bernard Pianalto
Attorney, Agent, or Firm—Merchant, Gould, Smith, Edell, Welter & Schmidt

[57] ABSTRACT

A metal fuel for producing power for propulsion is disclosed. The fuel is made up of a metal core, a metal barrier and an oxidizer layer. The combination of materials disclosed provides a means for melting the metal core so that it can be oxidized in an exothermic reaction to produce power. The metal fuel may also be stabilized with respect to auto-ignition by adding a binder layer. A method for producing the metal fuel is also described herein.

8 Claims, 4 Drawing Sheets

FIG. 2A
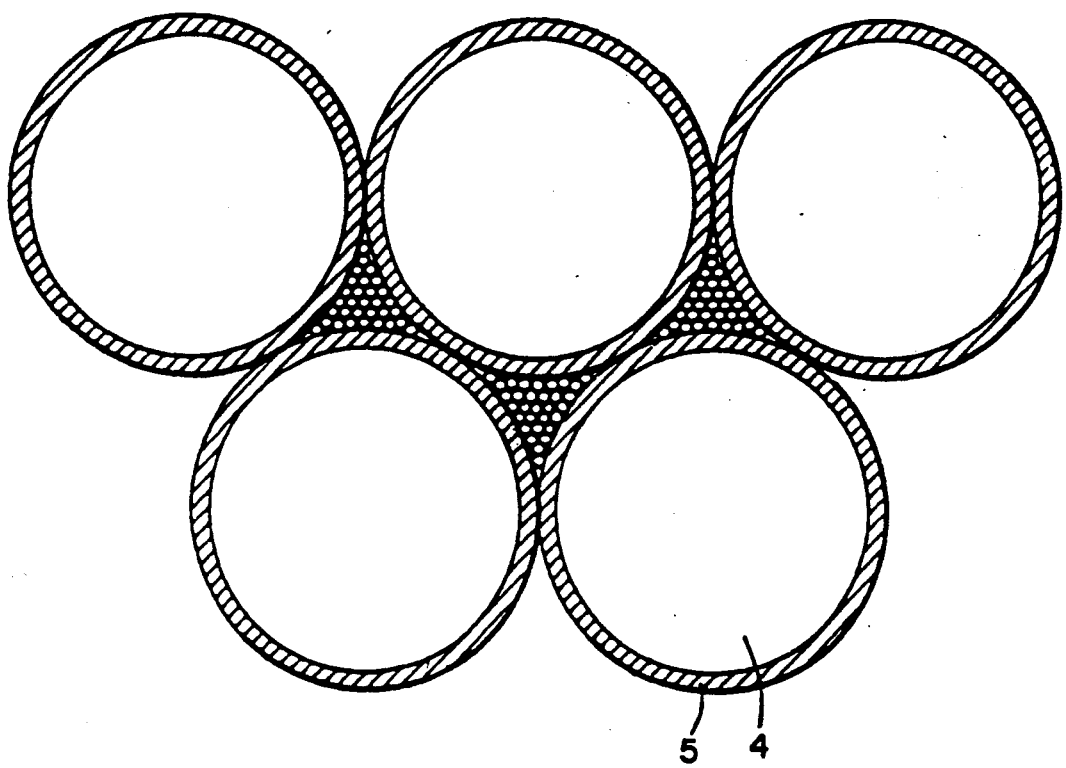
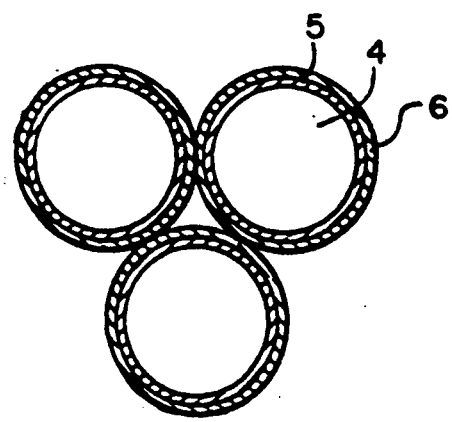
FIG. 2B

FIG. 4A
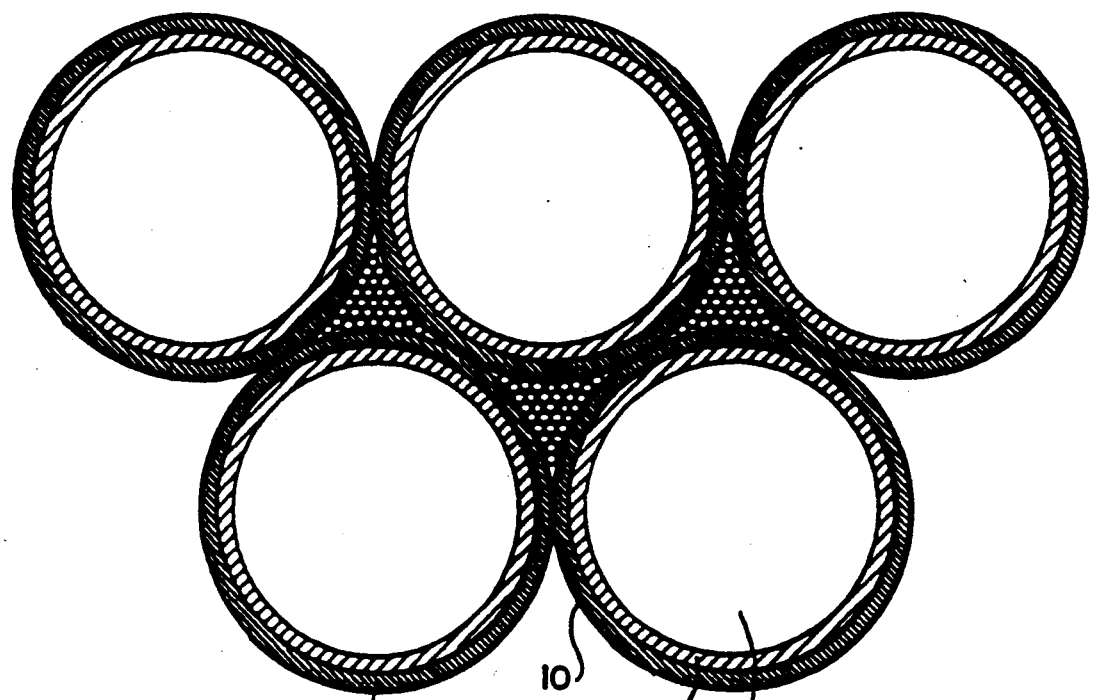
FIG. 4B
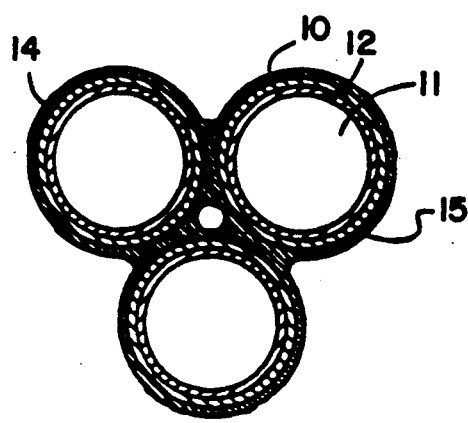
FIG. 4C

METHOD OF MAKING OXIDIZER COATED METAL FUELS

FIELD OF THE INVENTION

This invention relates to a method of generating heat, and ultimately power for propulsion, by utilizing metal fuels comprising a metal core encapsulated by an oxidizer such as fluorine substituted polymeric materials, and means for preventing the hypergolic reaction of the metal core and the oxidizer.

BACKGROUND OF THE INVENTION

Metal fuels comprising metals and oxidizers have been used for many years to produce heat, and power for propulsion in a variety of applications ranging from rocket motors to heat sources for steam boilers used in torpedoes. The selection of a metal and oxidizer, and their physical configuration, varies with the application depending on the system mission, heat output requirements, permissible reaction products, available space and many other factors.

A major distinction in this regard has to do with whether the system is open or closed with respect to expulsion of the reaction products. If the system is open so that the reaction products can be exhausted to the external environment, considerations such as pressure buildup due to the evolution of gaseous reaction products is not an issue. In fact, as is the case for solid rocket motors, it may be essential to the performance of the system. In circumstances, however, where the system is closed with respect to the expulsion of reaction products, particularly gaseous reaction products, to the external environment such as in torpedo propulsion applications, the permissible combinations of metals and oxidizers and their physical configuration are limited because the reaction products must be contained within the propulsion system. Gaseous reaction products present a particular problem. Generally, metal fuel/oxidizer systems operate at relatively high temperatures. Evolution of gaseous reaction products, even in relatively small amounts, at the operating temperatures of these systems can produce undesirable operating pressures within these closed systems according to the Ideal Gas Law:

$$PV = nRT$$

Where P is the system pressure, T is the system operating temperature, n is the number of moles of the gaseous reaction product, R is a constant depending on the units used for the other variables, and V is the volume of the system.

The present invention is directed toward, but not limited to use in, applications where the system is closed and the evolution of gaseous reaction products during the oxidation of the metal fuel is undesirable.

While many combinations of metal fuels and oxidizers are possible, it has been noted previously that lithium metal can be used in combination with fluorocarbon polymer oxidizers in applications where the system must be closed with respect to its external environment. In particular, lithium is currently used as a metal fuel in closed-loop torpedo applications. Lithium has been utilized because of its relative commercial availability and its ability to chemically react with numerous oxidizers. Fluorocarbon polymers have been utilized as oxidizers principally because they provide large heats of reaction and because they generally do not produce significant amounts of gaseous reaction products.

One particular combination which has been suggested utilizes pellets or granules of lithium which have had their surfaces coated with a relatively thin layer of fluorocarbon polymer oxidizer. In this system the reaction between the lithium and fluorocarbon polymer is initiated by an explosive detonator or similar device. The resulting reaction between a portion of the lithium and the fluorocarbon polymer is used to produce sufficient heat to melt the remaining lithium so that it can be further reacted with an oxidizing medium such as gaseous sulfur hexafluoride to provide the heat necessary to drive a steam boiler for a torpedo. It should be particularly noted, that the reaction between the lithium and fluorocarbon polymer oxidizer is not the principal source of heat in this system. The lithium/fluorocarbon polymer reaction is only intended to generate sufficient heat to melt the lithium granules so that the molten lithium can be reacted with the main oxidizing medium, sulfur hexafluoride.

The lithium/fluorocarbon polymer combination has a significant disadvantage, however, in that for a plurality of pellets, it is possible to initiate a hypergolic oxidation reaction between the lithium an fluorocarbon polymer accidentally due to vibration, mechanical shock or other movement of the pellets with respect to one another. Such motion can cause adjacent pellets to rub against one another. This mechanical rubbing, because of the frictional forces involved, can produce heat sufficient to initiate the reaction between the lithium and fluorocarbon polymer coating. Accidental initiation of this oxidation reaction presents significant safety concerns related to handling of torpedoes which utilize these fuels.

It has been suggested that barrier layers of other polymeric materials could be placed either over the outer surface of the fluorocarbon polymer oxidizer, or between the lithium and the oxidizer layer to protect against frictional rubbing of adjacent pellets. The principal requirement set forth for such a barrier layer is that it be less reactive with the lithium fuel than is the fluorocarbon polymer oxidation layer and thereby, have a lesser probability of accidental hypergolic reaction with the metal fuel. In such a system, the fuel pellets are allowed to move with respect to one another, and the added polymer layer is expected to reduce the friction between adjacent pellets and thereby lessen the probability of accidental hypergolic reaction of the lithium and fluorocarbon polymers.

A significant problem exists with this method, however, in that polymers suggested for use as the barrier layer, including polyparaxylene or dichloropolyparaxylene, contain elements which produce gaseous reaction products, such as hydrogen or hydrogen containing compounds, when the lithium is ultimately oxidized by the fluorocarbon polymer oxidizer. The evolution of gaseous reaction products can lead to pressurization of the system in which the fuel is located, and result in catastrophic failure of a closed-loop propulsion system.

At the operating temperatures of systems utilizing lithium fuels, which can be upwards of 1,000 degrees centigrade, the evolution of gaseous reaction products and resulting pressurization of the system can impose very significant design constraints, such as the need for pressure vessel containers for the fuel. Therefore, it is very desirable to develop other combinations which prevent the hypergolic reaction of lithium, as well as other metal fuels, and oxidizer coatings.

SUMMARY OF THE INVENTION

The present invention pertains to a metal fuel utilizing a metal core such as lithium, an oxidizer coating such as a fluorocarbon polymer oxidizer, and a barrier between the metal core and oxidizer to prevent their accidental hypergolic oxidation. This invention also pertains to a binder means to bind adjacent metal fuel pellets to one another and thereby further reduce the probability of their accidental spontaneous reaction.

The metal fuel was developed for, but not limited to, applications which require the oxidation reaction to take place in a closed system, such as torpedo applications. A significant feature of the invention is the use of a metal barrier layer sufficient to prevent accidental spontaneous oxidation of the metal core and oxidizer media. Metal barriers introduce an improvement over previous combinations as noted above by eliminating, or at a minimum substantially reducing, the barrier layer as a source of gaseous by-products during the oxidation reaction. An additional improvement set forth in this invention is the use of a binder means to reduce the mechanical interaction of the pellets and thereby further reduce the probability of hypergolic reaction of adjacent pellets.

BRIEF DESCRIPTION OF THE DRAWINGS

FIGS. 2A and B are an illustrative section view of a plurality of fuel pellets.

FIGS. 4A–C are an illustrative section view of a plurality of pellets incorporating a binder material to agglomerate adjacent fuel pellets.

DESCRIPTION OF THE PREFERRED EMBODIMENT

Figure 1:
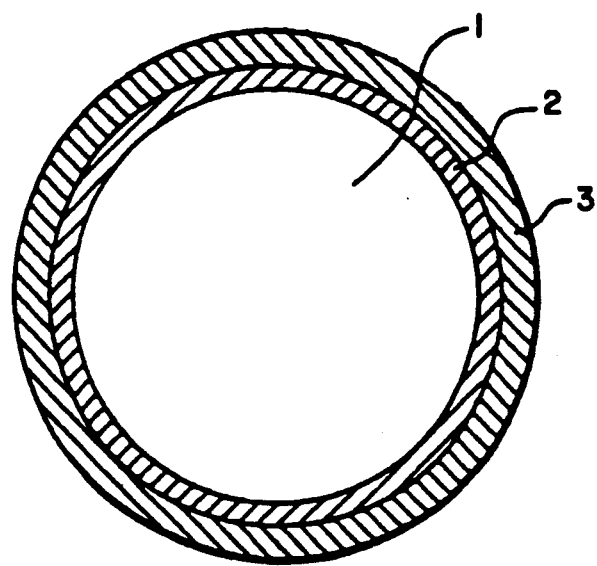
FIG. 1 is an illustrative section view of a single fuel pellet.

Oxidizable metal fuels are used in a number of applications including both military and space applications. One preferred embodiment of this invention has a particular application to torpedo propulsion systems. A metal fuel is used to heat a steam boiler which in turn drives a steam turbine which is used to propel the torpedo. Size and weight constraints in torpedo applications together with performance requirements, generally dictate that their boilers be designed to operate at high temperatures, but not high pressures. Since these propulsion systems are closed-loop, and therefore do not exhaust reaction by-products to the external environment, it is necessary that the oxidation of the metal fuel produce a minimum amount of gaseous by-products and hence, a minimum amount of pressure.

The use of oxidizable metal fuels in torpedo applications also requires that the fuels be designed such that they are safe from accidental ignition. The present invention is designed to provide a safe power source for torpedo applications based upon the use of an oxidizable metal fuel; however, its use is not limited to such applications.

In current torpedo propulsion systems, lithium is typically utilized as the metal fuel. The lithium is incorporated into the combustion chamber of a steam boiler in combination with an admixture of aluminum and potassium perchlorate, an oxidizer, and utilized in the following steps:

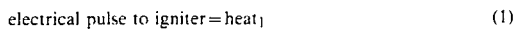

electrical pulse to igniter = heat$_1$   (1)

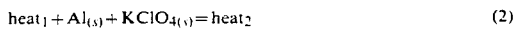

heat$_1$ + Al$_{(s)}$ + KClO$_{4(s)}$ = heat$_2$   (2)

heat$_2$ + Li$_{(s)}$ = Li(l)   (3)

Li$_{(l)}$ + SF$_{6(g)}$ = heat$_3$   (4)

heat$_3$ + H$_2$O = steam   (5)

In step 1, an ignitor is used to initiate the chemical reaction of step 2 in which the aluminum is reacted with the potassium perchlorate. The resulting reaction is strongly exothermic and the quantity of aluminum and potassium perchlorate is designed so as to provide sufficient heat to melt the remainder of the lithium in the oxidation chamber. Once the lithium is molten, it is reacted with sulfur hexafluoride. The resulting reaction is highly exothermic, and the heat generated is used to produce the steam required to drive the torpedo's steam boiler.

An embodiment of the invention is directed toward replacing the aluminum and potassium perchlorate used to melt the lithium fuel. This fuel system is known to be subject to failures due to the spontaneous reaction of the constituents in response to mechanical stimuli such as vibration and shock. This embodiment incorporates a thin fluorocarbon polymer oxidizer coating over the surfaces of cores of lithium for use as metal fuel pellets and utilizes portions of the lithium cores themselves, along with the fluorocarbon polymer oxidizer reactants, for an exothermic reaction to melt the remainder of the lithium according to the following steps:

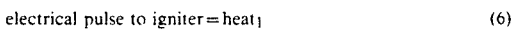

electrical pulse to igniter = heat$_1$   (6)

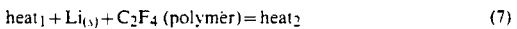

heat$_1$ + Li$_{(s)}$ + C$_2$F$_4$ (polymer) = heat$_2$   (7)

heat$_2$ + Li$_{(s)}$ = Li$_{(l)}$   (8)

In step 6, an igniter is typically used to provide the heat necessary to initiate the reaction. The layer of fluorocarbon polymer oxidizer on each pellet, represented in step 2 as C$_2$F$_4$, reacts exothermically with a portion of each lithium pellet resulting in the liberation of additional heat and results in the melting of the remaining portions of the pellets as indicated in step 8. Once the lithium is molten, it is then typically reacted with sulfur hexafluoride to produce the heat necessary to drive the steam boiler in the same way shown above in steps 4 and 5.

This invention is particularly directed toward supplying a means for safely incorporating the fluorocarbon polymer oxidizer coating by providing a metal barrier layer to protect against accidental initiation of the reaction shown in step 7. The invention also combines the barrier layer protection noted with a binder means to further reduce the probability of accidental ignition Referring now to the drawings, particularly to FIG. 1, the arrangement of one embodiment of a single oxidizer coated fuel pellet prior to the initiation of the oxidation reaction is shown and further explained.

Only one pellet is shown. Conceivably one pellet could provide sufficient heat energy for a given application, but typically a plurality of pellets is used, the actual size and number being dictated by the power output and size requirements of the system in which it is used. A fuel pellet consists of core 1 which may be made from any metal which is capable of being oxidized. Lithium, sodium, potassium, magnesium, or calcium should be particularly good candidates because of the relative ease with which oxidation reactions can be initiated with these metals. System configuration, heat output requirements, available oxidizer media, activation energy with respect to the oxidizer, and other factors influence the selection of a particular metal for core 1. Lithium has been used, but other metals could also be used depending on the particular application and the requirements mentioned. Core 1 may be of any shape, from spherical to highly irregular, depending on numerous factors including, but not limited to: the particular application in which the fuel is to be used, the process or processes used to deposit subsequent layers over the cores, the nature of the materials to be applied as subsequent layers over the cores and the commercially available forms of the metal. In addition, where a plurality of cores are used, the cores need not be of the same size or shape. In some applications, it is known to be preferable to use cores of several different sizes or shapes as shown in FIG. 2 in order to provide an optimum packing density for the metal fuel. Theoretical calculations and notations in related art indicate that a mixture of two different sizes in a ratio on the order of 7:1 to 20:1 provides a more optimum packing density than does a plurality of pellets of the same size.

Referring again to FIG. 1, a barrier layer 2 is deposited over the core 1. Barrier 2 provides a mechanical and chemical barrier between core 1 and an oxidizer 3 which is deposited as an additional layer over barrier 2. Barrier 2 is made from a metal, or alloy of two or more metals, which is substantially less reactive with respect to oxidizer 3 than is the metal of core 1. By less reactive in this context, it is meant that the metal of barrier 2 requires more energy input, as by frictional energy or otherwise, to initiate a chemical reaction with oxidizer 3 than does the metal of core 1. As an example, if core 1 is made from lithium, one barrier 2 which could be used with a fluorocarbon polymer oxidizer 3 would be a layer of aluminum. Other suitable barrier 2 materials for fluorocarbon oxidizers could be tin, antimony, bismuth or copper depending on the application factors noted above.

Referring again to FIG. 2, in some instances where a plurality of cores are used, it may not be necessary or desirable to coat all of the cores with an oxidizer. One preferred embodiment utilizes two different sizes of core 4 coated with barrier 5, but only the smaller cores 4 are coated with oxidizer 6. The reasons for this are that firstly, the smaller cores 4 ignite more easily and have less thermal mass than the larger cores 4 and, therefore, generate heat more rapidly than the larger fuel pellets. Secondly, the smaller cores 4 require smaller heat input to initiate the reaction between cores 4 and oxidizer 6. Finally, larger cores 4 can sometimes be more difficult to coat with oxidizer 6, and the resulting layer can be thinner, making them more difficult to initiate than smaller cores 4. Various means can be used to deposit barrier 5 on cores 4 depending on the metallurgical characteristics of the metals, desired coating thickness and other factors. Techniques comprising electroless plating, sputtering, vapor deposition and other deposition techniques may be used depending on the factors noted.

Figure 3:
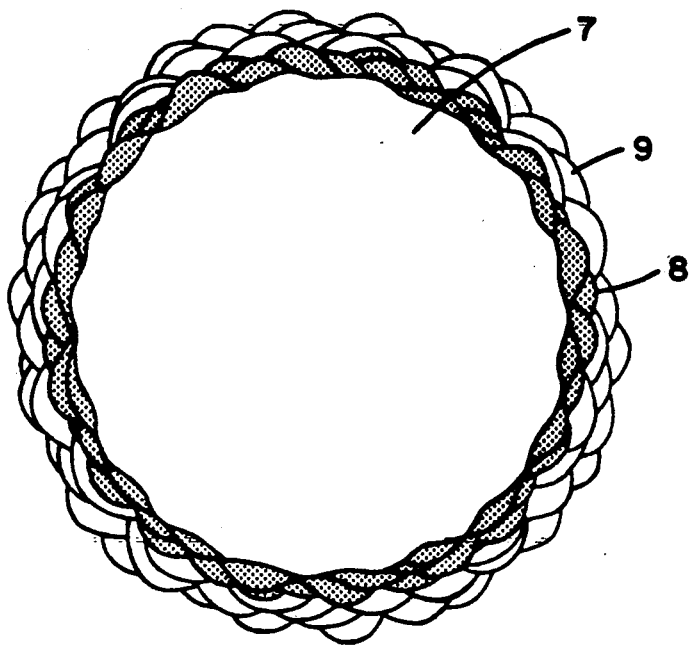
FIG. 3 is an illustrative section view of a fuel pellet coated with a barrier layer and oxidizer utilizing the magnetic mixing method.

Referring now to FIG. 3, one preferred means to coat a core 7 utilizes magnetic mixing to deposit a barrier 8. In this technique, particles of the material to be used for barrier 8 are inserted in a container with core 7 and magnetic stirring media. The container is then subjected to a magnetic field which varies in magnitude and direction with time. The magnetic field causes the magnetic stirring media to stir core 7 and the material used for barrier 8. The impact of the magnetic stirring media against the core 7 and barrier 8, causes particles of barrier 8 to stick to core 7. The net result is shown in FIG. 3, barrier 8 layer is deposited onto core 7.

Referring again to FIG. 1, once barrier 2 has been deposited, oxidizer 3 is then deposited over barrier 2. While many types of materials can be used for oxidizer 3, one embodiment utilizes a fluorocarbon polymer material such as poly-tetrafluoroethylene (PTFE). One advantage of utilizing a highly fluorine substituted hydrocarbon such as PTFE is that its reaction with the material of core 1 is sufficiently exothermic to melt core 1.

Other oxidizer 3 materials could include fluorocarbon telomers, fluorocarbon polymers or fluorochlorocarbon telomers depending again on the application related factors noted above. Another advantage is that the resulting reaction products are substantially nonvolatile. In closed-loop applications, this avoids the pressurization of the reaction chamber by reaction product gases.

Referring again to FIG. 3, various means can be used to coat core 7 and barrier 8 with oxidizer 9 depending on the materials involved, coating thicknesses required and other factors. One method which can be employed utilizes the magnetic mixing technique described above for deposition of barrier 8. In this case, core 7 which already has barrier 8 applied and magnetic stirring media are placed in a container with particles of the material to be deposited as oxidizer 9. Magnetic mixing is accomplished as described above, producing a coating of oxidizer 9. The net result is illustrated by FIG. 3.

Referring now to FIG. 4, an additional feature of the invention is disclosed which can be used to provide enhanced protection against accidental ignition of a metal fuel. In situations where a plurality of fuel pellets 10 are used, each of which comprise a core 11 and a barrier 12, and some of which comprise an oxidizer 13, an additional binder 14 can be added as a layer over the surface of fuel pellets 10. This binder 14 can be made out of a variety of materials, particularly polymeric materials, depending on the application. The binder 14 is utilized as a means to cause the plurality of pellets 10 to agglomerate such that adjacent pellets become mechanically connected to each other and are not free to move with respect to one another. It is highly desirable that the binder 14 also function as an oxidizer so as to increase the overall efficiency of the heat producing system by avoiding the introduction of non-reactive or counter-reactive components. In applications where it is desired that binder 14 not produce gaseous by-products, it is desirable to use fluorine substituted polymers for binder 14 because they produce substantially nonvolatile reaction products. Conceivably the function of binder 14 could be accomplished by oxidizer 13, but typically the materials used for the oxidizer 13, such as PTFE, do not easily agglomerate using standard techniques such as melting, cross-linking using solvent or solventless techniques, or other methods. It has been found however, that a separate binder 14 of a fluorine substituted ter-plastic, or elasto-plastic polymer, can be used to provide a fluorinated polymer coating which can subsequently be processed to produce agglomeration of adjacent fuel pellets.

In a preferred embodiment, agglomeration can be accomplished by heating a plurality of pellets incorporating a ter-plastic coating of binder 14 to above its liquidus temperature. Upon melting, the plurality of binder 14 layers intermix and upon subsequent cooling form a substantially monolithic, continuous structure 15. The net effect is to lock the individual fuel pellets together and prevent movement with respect to one another. Agglomeration can also be enhanced by applying pressure to the plurality of pellets 10 while the mixture is being heated so as to bring them into closer proximity. Other binder 14 layers are possible which could utilize other techniques to cause agglomeration such as the use of ultraviolet radiation or organic solvents to cause agglomeration by cross-linking.

We claim:

1. A method for producing a metal fuel by deposition on a metal core, comprising:
   (a) deposition of a metal barrier on the outer core of said metal core;
   (b) deposition of an oxidizer on the outer surface of said metal barrier; wherein,
   the oxidizer is a fluorocarbon polymer;
   the metal fuel is capable of easy reaction initiation and rapid, highly exothermic reaction with the fluorocarbon polymer; and
   the metal barrier is substantially less reactive with the fluorocarbon polymer than is the metal fuel.

2. The method of producing a metal fuel by deposition on a metal core of claim 1, further comprising deposition of a binder to the outer surface of said oxidizer.

3. The method for producing a metal fuel by deposition on a metal core of claim 2 wherein said deposition of said metal barrier comprises:
   placing said metal core in a container along with a particulate mixture of the material to be deposited as said metal barrier and magnetic stirring media; and
   exposing said magnetic stirring media to a first magnetic field which varies in magnitude and direction with time, thereby producing a mechanical mixing action and causing said particulate material to be deposited on the outer surface of said metal core as said metal barrier.

4. The method for producing a metal fuel by deposition on a metal core of claim 3 wherein said deposition of said oxidizer comprises:
   spraying a solution of a solvent and said oxidizer onto the outer surface of said metal barrier layer; and
   removing the solvent, thereby causing the outer surface of said metal barrier to be coated with said oxidizer.

5. The method for producing a metal fuel by deposition on a metal core of claim 4 wherein said deposition of said oxidizer comprises:
   placing said metal core already containing said metal barrier layer in a container along with a particulate mixture of the material to be deposited as said oxidizer and magnetic stirring media; and
   exposing said magnetic stirring media to a second magnetic field which varies in magnitude and direction with time, thereby producing a mechanical mixing action and thereby causing said particulate material to be deposited on the outer surface of said metal barrier layer as said oxidizer.

6. The method for producing a metal fuel by deposition on a metal core of claim 5 wherein said deposition of said binder comprises:
   spraying a solution of a solvent and said binder onto the outer surface of said oxidizer; and
   removing the solvent, thereby causing the outer surface of said oxidizer to be coated with said polymeric binder.

7. A method according to claim 1 wherein the metal fuel is lithium, sodium, potassium, magnesium or calcium.

8. A method according to claim 1 wherein the metal barrier is aluminum, tin, antimony, bismuth or copper.

* * * * *